United States Patent

[11] 3,573,820

[72] Inventor Peter K. Bohacek
    Morris Township, N.J.
[21] Appl. No. 814,317
[22] Filed Apr. 8, 1969
[45] Patented Apr. 6, 1971
[73] Assignee The United States of America as represented by the Secretary of the Air Force

[54] METHOD AND SYSTEM OF RANGE SIDELOBE REJECTION IN A MULTITARGET ENVIRONMENT
3 Claims, 6 Drawing Figs.
[52] U.S. Cl. .................................................. 343/7, 343/17.1
[51] Int. Cl. .................................................. G01s 9/02, G01s 7/28

[50] Field of Search ........................................... 343/17.1, 7 (RS)

[56] References Cited
UNITED STATES PATENTS
2,786,997  3/1957  Chambers ....................  343/17.1

Primary Examiner—Rodney D. Bennett, Jr.
Assistant Examiner—T. H. Tubbesing
Attorneys—Harry A. Herbert, Jr. and Julian L. Siegel ABSTRACT: A method and system of determining range sidelobe radar return by forming two thresholds, one formed by coherent addition and the other formed by rms addition and then the smaller threshold is selected. The video signal is then compared to the selected threshold.

INVENTOR.
PETER K. BOHACEK
BY Harry A. Herbert Jr
and Julian L. Siegel
ATTORNEYS

METHOD AND SYSTEM OF RANGE SIDELOBE REJECTION IN A MULTITARGET ENVIRONMENT

BACKGROUND OF THE INVENTION

Many radar applications require a waveform that not only has very good range resolution but also contains a large amount of energy. This is usually accomplished by transmitting waveforms that have some amplitude or frequency modulation, such as pulse trains or chirped signals. Using these signals and appropriately matched receiving filters, a point target produces a narrow and high radar return after demodulation, allowing targets that are close together to be resolved. In addition, however, each target has a low level return surrounding the main return. These low level range sidelobes last about twice the duration of the transmitted signal, and their typical maximum value lies about 30 to 40 DB below the peak signal return. As the target density increases, the sidelobes of all the targets begin to overlap and add in some manner and thus reduce the effective signal-to-sidelobe clutter ratio. This problem is particularly severe for targets that have large wakes. For these targets the total range sidelobe level increases very significantly so that the signal-to-sidelobe clutter ratio can typically be reduced to 10 or 20 DB. These range sidelobes can easily be mistaken for other targets or the beginning of the wake resulting in an excessive number of false alarms and difficulty in tracking the waking target.

The process of range sidelobe rejection consists of setting a threshold such that the probability of the sidelobes exceeding this is P, where P is an appropriately chosen small number, and then accepting only those targets that exceed this threshold. The present invention discloses two methods of choosing the proper threshold and the radar apparatus to implement these methods.

Ideally one would like to measure the size of each target with each target having a sidelobe structure that is clearly distinguishable. Before envelope detection, each sidelobe structure is an IF sinewave of some amplitude, frequency, and phase. Only the amplitude is known since it is related to the target amplitude while the frequency and phase are unknown because the exact velocity and fine grain range information are not available.

When there are several targets, the sidelobe structures overlap and add in some manner and since the phases of the sinusoids are not known, it is impossible to tell how they add. The best that can be done is to set a threshold, B, such that the probability that the envelope of the sum of the sinewaves exceeds this is P.

The problem of finding the threshold is essentially equivalent to the random lobe problem where each step has a random direction and the size of the steps can vary. A useful form of the solution to this problem has been shown by W. R. Bennett (Distribution of the Sum of Randomly Phased Components, Quart. Applied Math., V.5, pp. 385—393; Jan. 1948). From this solution it is possible to find the probability P given the amplitude of the sinewaves and the threshold B.

In the range sidelobe problem, however, it is necessary to find B, given P and the amplitude of all the sinewaves. In principle this can be solved but it means an iterative solution and for use in a radar a very high-speed digital computer would be necessary.

The present invention provides an improved method and system than that used in the past, being more ready to implement and to evaluate the errors.

SUMMARY OF THE INVENTION

Two methods are shown for estimating the range sidelobes of a radar return. In the first method two thresholds are formed, one assuming coherent addition and the other assuming r.m.s. addition, of which the smaller is taken. This results in an average error between 0 and 15 percent and a maximum error of about 50 percent.

The second method is a variation of the first method and overcomes the difficulty of large errors when there is one large component and many small components.

Using one of these methods it is possible to distinguish between real targets and sidelobes of large targets. To implement them it is only necessary to know the approximate envelope of the sidelobes of a point target.

It is therefore an object of the invention to provide an improved system for range sidelobe rejection.

It is another object to provide a method and system of distinguishing real targets and sidelobes from large extended targets.

It is still another object to provide a method and system of range sidelobe rejection that avoids a complex iterative solution.

These and other advantages, objects and features of the invention will become more apparent from the following detailed description when taken in conjunction with the illustrative embodiments in the accompanying drawings, wherein:

DETAILED DESCRIPTION OF THE INVENTION

Figure 1:
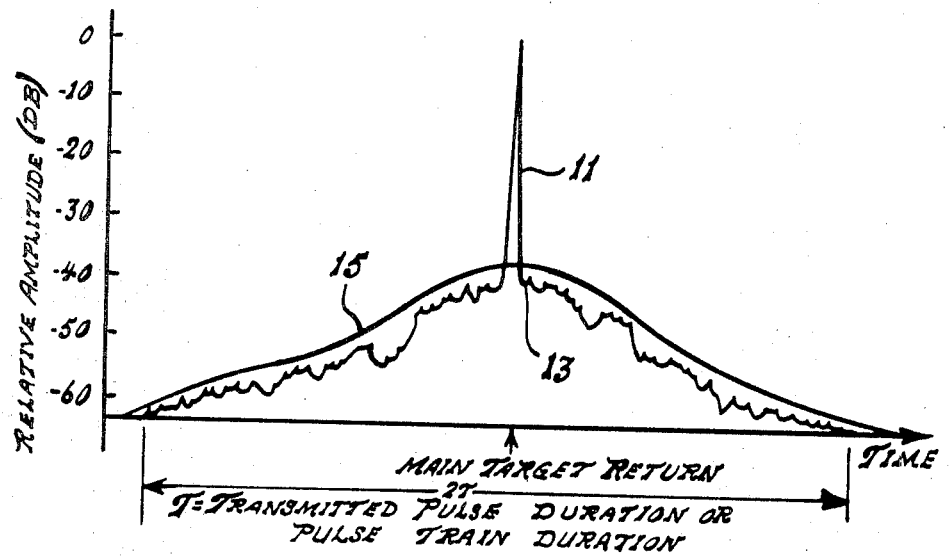
FIG. 1 is a graph of a typical radar output for one large point target showing the desired sidelobe threshold.

Referring to FIG. 1 there is shown the output from one large target, the main target return is at 11 and low level sidelobes 13 lie about 32—40 DB below the peak return. Line 15 represents the desired range sidelobe which is a function of time, $a(t)$.

Figure 2:
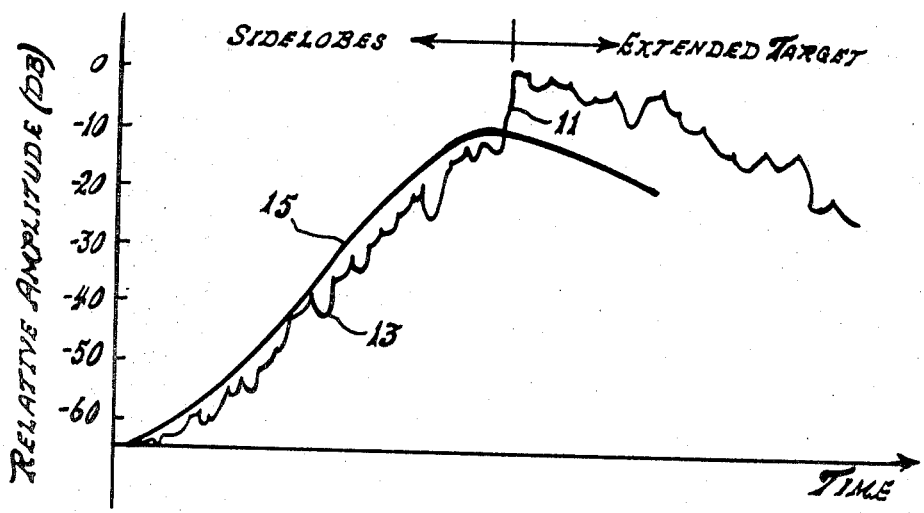
FIG. 2 is a graph of a typical radar output for a long extended target showing the desired sidelobe threshold.

FIG. 2 shows a situation where the target density has increased and the sidelobes of all the targets begin to overlap and add, reducing the ratio between signal 11 and sidelobes 13 (signal-to-sidelobe ratio) to 10—20 DB. Again, line 15 represents the desired range sidelobe threshold.

The IF sidelobe structure can be expressed as a summation of various sinewaves, as given by:

$$s(t) = \sum_{i=1}^{N} a_i(t) \cos(\omega_0 t\, \theta_i) \tag{1}$$

Where $N$ is the number of targets, $a_i(t)$ is the sidelobe amplitude caused by the $i$-th target at the time $t$, $\omega_0$ is the IF frequency (it does not matter if the frequency is not the same for all sidelobes) and $\Theta_i$ is the phase. The envelope of this is then:

$$E(s(t)) = \sqrt{\left(\sum_{i=1}^{N} a_i(t) \cos \theta_i\right)^2 + \left(\sum_{i=1}^{N} a_i(t) \sin \theta_i\right)^2} \tag{2}$$

If $N$, the number of targets, is very large, then by the central limit theorem the terms in parentheses of equation 2 tend to become independent, Gaussian random variables. If that is the case, then $E(s(t))$ tends to become a Rayleigh distributed random variable with probability density that results in a threshold.

$$B = \sqrt{\ln(1/P)} \sqrt{\sum_{i=1}^{N} a_i^2} \tag{3}$$

Hence, the correct threshold for very large $N$'s is proportional to the square root of the sum of the squares of each sidelobe component.

If $N$ is very small, say 1, then clearly $E=a_1$ and $B$ should be equal to $a_1$ for all $P$'s. For a somewhat larger $N$, say 2 or 3, it is found from Bennett's results that the threshold $B$ should be very close to $$B = \sum_{i=1}^{N} a_i \qquad (4)$$

for all $P$'s. In other words, coherent addition is assumed for all sinewaves. $N$ need not be very large for equation (3) to hold and that up to then equation (4) is approximately correct.

An estimate of the threshold can be found using the following method:

a. adding up all amplitudes using equation (4) (assuming a small number of targets) and call this threshold $B_1$;

b. adding up all the amplitudes in an RMS fashion, using equation (3) (assuming a large number of targets), multiplying by the appropriate constant, $\sqrt{\ln(1/P)}$, and calling this threshold $B_2$; and c. choosing the smaller of the thresholds $B_1$ and $B_2$.

For a small number of targets threshold $B_1$ will be chosen as it should be, and for a large number threshold $B_2$ will be chosen. Assymptotically this method behaves properly for large and small $N$'s. For other values of $N$, this method also works quite well as is shown below.

It has been found that the threshold picked as described differs on the average from the optimum threshold by about 0 to 15 percent for any $N$ and almost any random distribution of target amplitudes. In fact, the error in the threshold is almost independent of the distribution of the target amplitudes. This is true except when there is a large number of small targets and a few (one or two) very large targets. Under these conditions, the central limit theorem does not hold, since the few targets dominate the distribution. But, even here the threshold found in the above way differs by no more than 50 percent for most practical cases.

Various probability densities are assumed for the individual sidelobe components, $a_i$ which are listed below:

a. delta function probability density, i.e., all components are equal;

b. Rayleigh probability density;

c. exponential probability density;

d. uniform probability density;

e. uniform probability density from 0 to 0.5 and from 2.5 to 3, referred to as bimodal 01; and f. uniform probability density from 0 to 0.9 and from 10.9 to 11, referred to as bimodal 02.

For each of the probability densities a number of samples were taken for each $N$, and the percent error between the optimum and approximate threshold was computed and an error curve plotted. A sharp break in the error curve takes place when the switch occurs between the linear threshold and the RMS threshold. At that point, the error is largest. For lower values of $N$ it matters little what the actual probability density of the amplitudes is since the threshold is essentially the linear sum of all components. For larger values of $N$ the error is still largely independent of the probability density. This means that $N$ is large enough so that the envelope is close to Rayleigh and equation (3) applies. The maximum error occurs when there is one large component and many small components.

Figure 3:
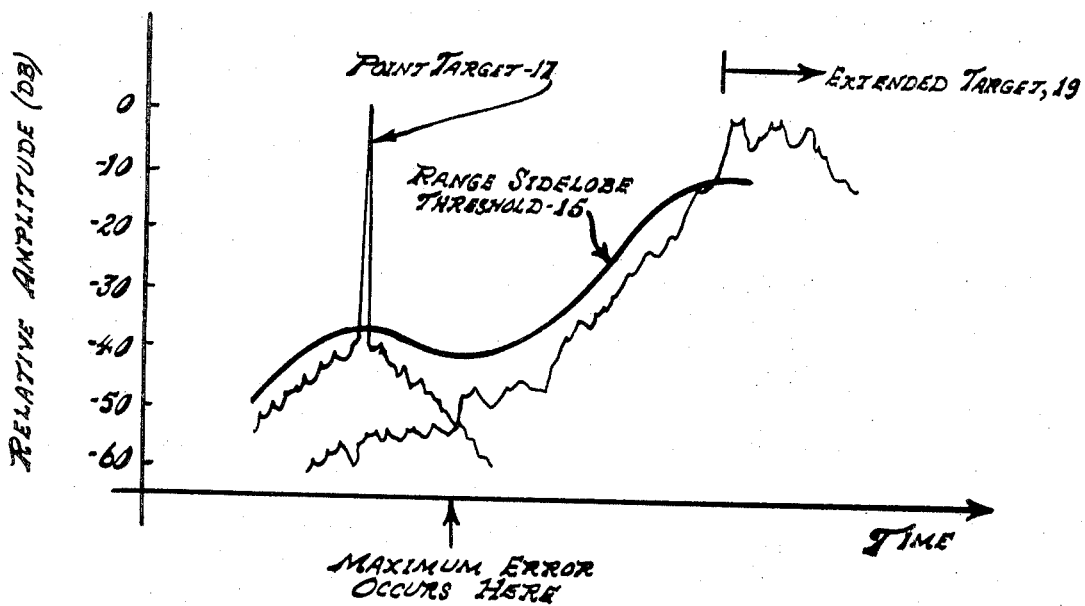
FIG. 3 is a graph of radar output for a large extended target together with a point target and showing the range sidelobe threshold.

The first method described above works very well as long as there is not a small number of very large components and a very large number of very small components. This situation as shown in FIG. 3 would tend to occur when an isolated target is found some distance from the very extended target 19. Here extended target 19 would contribute many low level sidelobes and point target 17 would contribute one much larger sidelobe component. In such a situation the maximum error would be as high as 50 percent to 60 percent resulting in a 3 to 5 DB loss of visibility in that region. Consequently, a second method is provided to overcome this difficulty. It consists of:

a. forming the linear threshold $B_1$, as in the first method;

b. forming the RMS threshold $B_2$ as in the first method;

c. adding all small components in an RMS fashion and linearly adding to this all large components to form threshold $B_3$; and d. choosing the smallest of these three thresholds. Thus, $$B_1 = \sum_{i=1}^{K} a_i + \sum_{i=1}^{M} A_i \qquad (5)$$

$$B_2 = \sqrt{\ln(1/P)} \sqrt{\sum_{i=1}^{K} a_i^2 + \sum_{i=1}^{M} A_i^2} \qquad (6)$$

$$B_3 = \sqrt{\ln(1/P)} \sqrt{\sum_{i=1}^{K} a_i^2} + \sum_{i=1}^{M} A_i \qquad (7)$$

where the $a_i$'s are the K, small components, and the $A_i$'s are the M, large components. It can be shown that $B_3$ must always be greater than the optimum threshold. Therefore, this method will never lead to a false alarm probability that is higher than planned.

Figure 4:
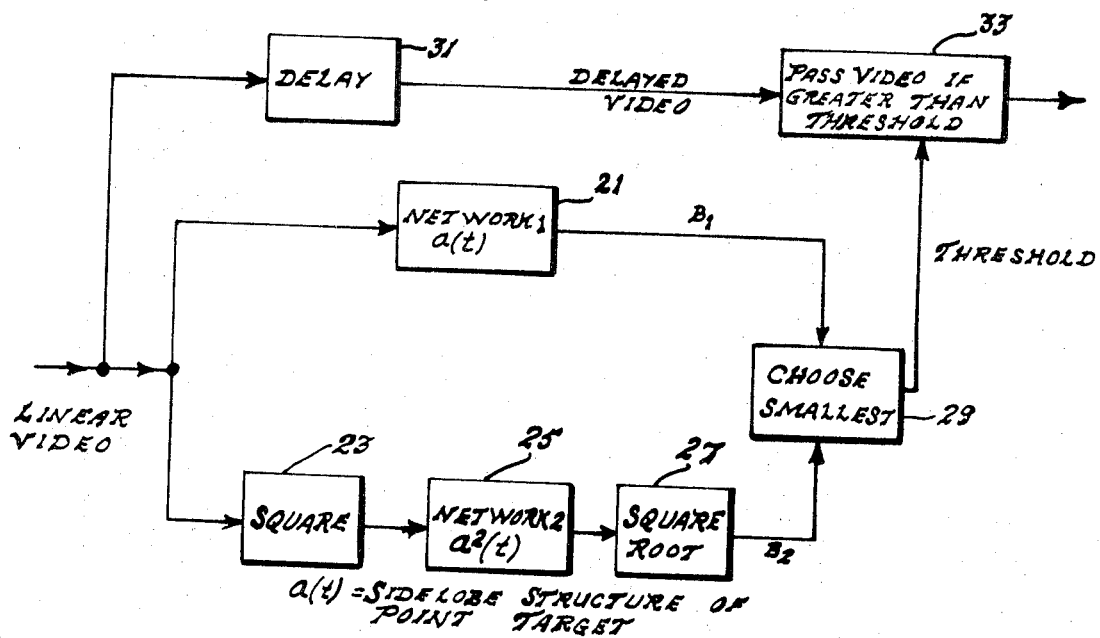
FIG. 4 is a block diagram showing radar apparatus for using the first method of the invention.

The above methods can readily be in a radar system. A block diagram implementing the first method is shown in FIG. 4. The video signal is fed to network 21 which is a linear network that has an input response equal to the square of the sidelobe structure of the point target which is a $(t)$ and an output designated as $B_1$. The video signal is also fed to a squarer 23 and then to network 25 which is a linear network that has an input response equal to the square of the sidelobe structure or $a^2(t)$. The signal is then fed to square root means 27 having an output designated as $B_2$. $B_1$ and $B_2$ are compared in comparison circuit 29 which selects the smallest value and this represents the threshold signal. The original video signal is delayed by delay circuit 31 and passed to circuit 33 together with the threshold signal. This circuit passes the video signal only if it is greater than the threshold signal.

Figure 5:
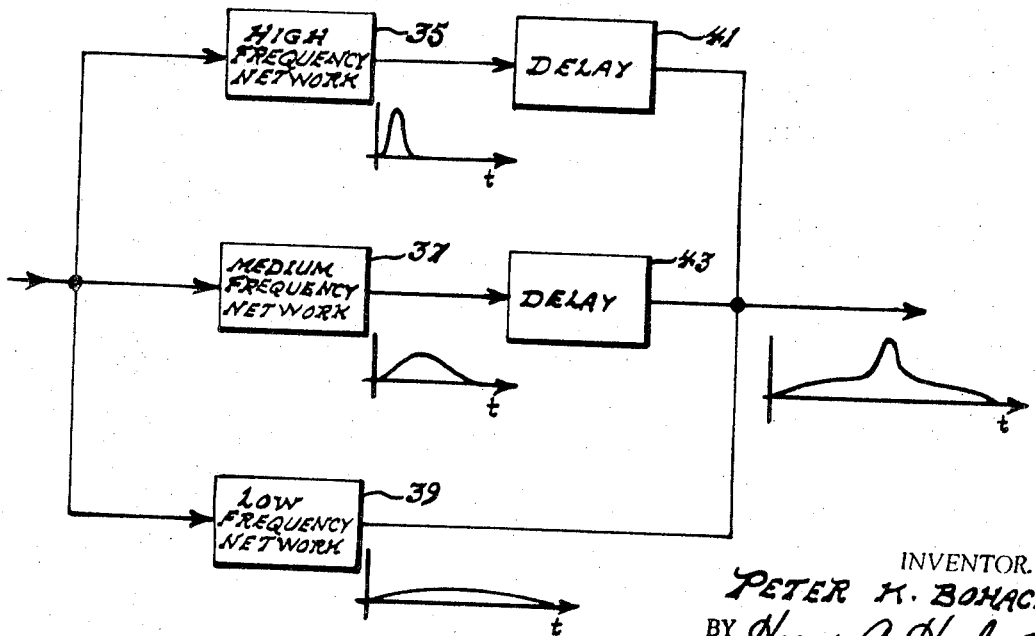
FIG. 5 is a block diagram showing details of the networks shown in FIG. 4.

The sidelobe structure of a point target generally increases very rapidly as one gets closer to the main body return. As a result, it is convenient to implement networks 21 and 25 as shown in FIG. 5. Here such subnetwork matches its small part of the sidelobe structure with high frequency network 35 taking the highest amplitude and the shortest duration part, low frequency network 39 taking the lowest amplitude and longest duration part, and medium frequency network 37 having the appropriate intermediate function. Delay lines 41 and 43 time equalize the signals for proper signal alignment.

Figure 6:
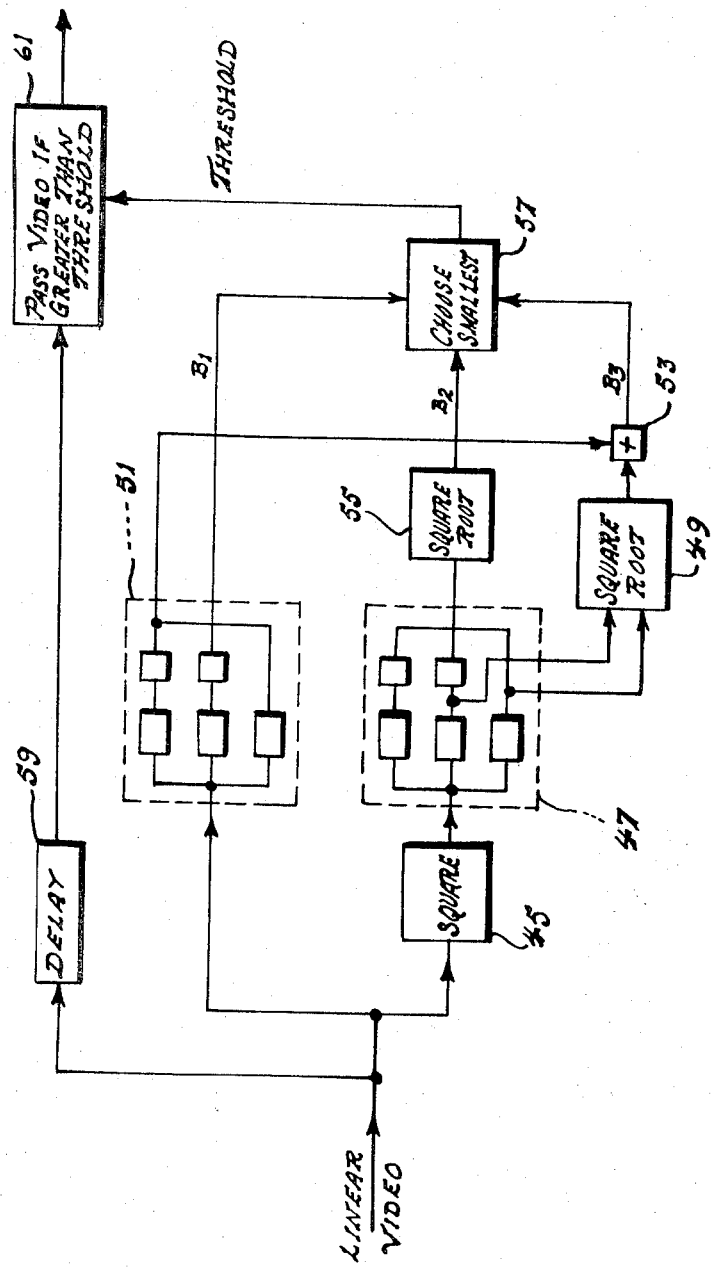
FIG. 6 is a block diagram showing radar apparatus for using the second method of the invention.

With the use of networks shown in FIG. 5, the second method described can readily be implemented. As shown in FIG. 6, the video signal is fed into squarer 45 and then fed to network 47 of the type shown in FIG. 5. The output of the medium frequency network and the combined output of the delayed high frequency and the low frequency networks are operated upon by square root circuit 49, the output thereof being a root mean square (rms) signal. The video signal is also fed to network 51, which is of the type shown in FIG. 5. The combined delayed linear high frequency and low frequency output from network 51 is added to the RMS output of network 47 in summer 53 forming signal $B_3$. Medium frequency output of network 47 is fed to square root circuit 55 whose output is designated as $B_2$. The medium frequency output of network 51, $B_1$, together with $B_2$ and $B_3$ is fed to comparison circuit 57 for selecting the smallest value and this represents the threshold signal. The original video signal delayed by delay circuit 59 is fed to circuit 61 which passes the video signal only if it is greater than the threshold. If a point target occurs from a large distance away from a long extended target, then the high level sidelobes will add linearly to the RMS signals of the extended target. As a result, this circuit operates in accordance with equation (7).

I claim:

1. A range sidelobe rejection system comprising:

a. s linear video signal input;

b. a first linear network fed by the video signal input and having an impulse response equal to the sidelobe structure of a point target;

c. means for squaring the video signal;
d. a second linear network fed by the squaring means and having an impulse response equal to the square of the sidelobe structure;
e. means for producing a square root of the output of the second linear network;
f. means for selecting the smallest output from the first network and the square root producing means, such selection representing the threshold; and
g. means for passing the video signal if greater than the threshold.

2. A range sidelobe rejection system according to claim 1 wherein the first and second networks comprise a high frequency subnetwork, a medium frequency subnetwork, and a low frequency subnetwork, each being fed by the video signal input and having their outputs joined at a common point.

3. A range sidelobe rejection system comprising:
a. linear video signal input;
b. a first linear network fed by the video signal and having a high frequency subnetwork, a medium frequency subnetwork, and a low frequency subnetwork, the output of the low frequency subnetwork together with the delayed output of the high frequency subnetwork comprising the first output of the first linear network, and the delayed output of the medium subfrequency subnetwork comprising the second output of the first linear network;
c. means for squaring the video signal;
d. a second linear network fed by the squaring means and having a high frequency subnetwork, a medium frequency subnetwork, and a low frequency subnetwork, the output of the low frequency network together with the delayed output of the high frequency subnetwork comprising the first output of the second linear network, the output of the medium frequency subnetwork comprising the second output of the second linear network, and the delayed output of the medium frequency subnetwork comprising the third output of the second linear network, and the delayed output of the medium frequency subnetwork comprising the third output of the second linear network;
e. a first means for preforming a square root, the first square root means being fed by the first and second outputs of the second linear network;
f. means for summing the outputs of the first square root producing means and the first output of the first linear network;
g. a second means for producing a square root fed by the third output of the second linear network;
h. means for selecting the smallest of the second output of the first linear network, the output of the second square root producing means, and the output of the summing means, the smallest selected output representing the threshold; and
i. means for passing the delayed video signal only if greater than the threshold.